Oct. 6, 1970 G. P. MINARCIK 3,533,080

DIGITAL CONTROL AND MEMORY BLOCK-OF-ACCESS ARRANGEMENT, PARTICULARLY FOR A COMMUNICATION SWITCHING SYSTEM

Filed Dec. 13, 1967 9 Sheets-Sheet 1

INVENTOR
GERALD P. MINARCIK
BY Bernard E. Franz
ATTY.

United States Patent Office 3,533,080
Patented Oct. 6, 1970

3,533,080

DIGITAL CONTROL AND MEMORY BLOCK-OF-ACCESS ARRANGEMENT, PARTICULARLY FOR A COMMUNICATION SWITCHING SYSTEM

Gerald P. Minarcik, Schaumburg, Ill., assignor to Automatic Electric Laboratories, Inc., Northlake, Ill., a corporation of Delaware Filed Dec. 13, 1967, Ser. No. 690,356
Int. Cl. G06f 9/18
U.S. Cl. 340—172.5 11 Claims

ABSTRACT OF THE DISCLOSURE

Common control equipment comprises five subsystems (1) a register-sender, (2) a translator and a route selector, (3) a trunk scanner, (4) a maintenance console, and (5) a peg count section. The memory access arrangement provides a cyclically recurring word time which is divided into three time periods for memory access. Two subsystems have individual access periods and the other three subsystems share one access period. Each system reads a word from memory during one word time cycle, performs processing operations making use of the data of that word, and re-writes the same or modified data for that word at the end of its word time cycle, and then changes to a different memory address. A block-of-access arrangement prevents two subsystems from having a word out of memory at the same time, which, with destructive read out, would cause loss of information.

CROSS-REFENENCES TO RELATED APPLICATIONS

The preferred embodiment disclosed herein is part of the system covered by a Murphy et al. U.S. Pat. 3,328,534 issued June 27, 1967 for a Communication Switching System. The switching network and marker of the system is described in U.S. patent application Ser. No. 463,587 filed June 14, 1967, now Pat. No. 3,413,421, by A. S. Cochran et al. for an Identifying Arrangement for Communication Switching Systems. The register-sender subsystem makes use of a time division multiplex arrangement in which the memory has a plurality of rows assigned to each register as covered by U.S. Pat. 3,299,214 issued Jan. 17, 1967 to K. E. Prescher et al. for a Communication Switching System Common Control Arrangement; this feature also being used in the system described in the D. K. K. Lee et al. U.S. Pat. 3,301,963 issued Jan. 31, 1967 for a Register-Sender Arrangement for a Communication Switching System Common Control Arrangement.

The arrangement disclosed herein providing means to share the same memory by a plurality of subsystems, specifically the register subsystem, the translator subsystem and the trunk scan subsystem, is covered by application Ser. No. 667,170 filed Sept. 12, 1967 by H. L. Wirsing and W. C. Miller. The provision of a peg count subsystem sharing memory access alternatively with the trunk scan subsystem, disclosed herein, is covered by application Ser. No. 690,348, filed the same day as this application by D. K. K. Lee, W. R. Wedmore and J. R. Vande Wege. The two applications mentioned in this paragraph issued on the same date as this application.

All of the above-mentioned patents and copending applications are owned by the same assignee as the present application.

BACKGROUND OF THE INVENTION

Field of the invention

This invention relates to digital data processing systems with storage devices, and more particularly to a common control arrangement for a communication switching system using a ferrite core memory arrangement.

Description of the prior art

There are many known systems in which different units share both data processing circuits and memory access time, some such systems being on a random access basis and others having cyclically recurring time intervals. U.S. Pat. 3,334,333, for example, discloses a system in which peripheral units are permitted access to the memory whenever the data processor does not require access of the same memory. There are also many systems in which several users share the same data processor so that each user appears to have continuous use of the processor, with either cyclically recurring access, or some other arrangement for handling access requests with some type of priority.

In communication switching systems with common control, a register arrangement is required to store the called-number digits for several originating calls in which dialing or other call signals are being received simultaneously. This is done by providing a register arrangement for each call, with each register allotted a time to sample the received signals and store information in accordance therewith. The common control equipment also may include a translator for interpreting the stored digits and providing routing information for operation of the switching network. In many such systems the registers share common processing logic circuits with each having an individual section in a common memory, each register having cyclically recurring use of the logic circuits along with access to the memory. In such systems the translator usually is provided with a separate memory having its own access circuits. The systems described in the above Prescher et al. and Lee et al. patents are of this nature. It would be desirable to use a single memory with the same set of access circuitry for the different functions. However the registers must each be provided with access to their common logic circuits and the memory at definite intervals to completely receive the dialed digits or other call signals, and a certain amount of time is required by the logical processing circuits to process the data. To adequately process the data for all of the registers, one at a time, sharing the register subsystem logic circuits, may require all of the available time if adequate sampling to record and process the received digital information is to be accomplished.

The said Wirsing and Miller application covers a system wherein a plurality of digital data processing subsystems share the same memory, using common access circuitry, with a cyclically recurring word time for memory access and processing of a memory word by each subsystem, the word time cycle being provided with a time period for each subsystem for access to the memory, with each subsystem during its access time having an interval to write one word, change the address to that of a different word, and to read the new word from memory. The subsystem then performs processing operations using the data of the word read from memory, while the other subsystems are provided with access to the memory during their access time periods. Each subsystem is provided with its own address generator, which may be arranged to receive random addresses from its subsystem, or may generate the addresses sequentially. One or more of the subsystems may be associated with a plurality of peripheral units, each of which is individually associated with a section of the memory; and more specifically each peripheral unit is individually assigned one or more memory addresses, and the data processing circuits of that subsystem are associated with the particular peripheral unit related to the address being generated for that subsystem. In a specific embodiment, incorporated in the common control equipment for a communication switching system, the subsystems include a register subsystem and a translator subsystem, with the register subsystem being associated with a plurality of peripheral units such as register junctors. The register junctors are assigned cyclically recurring time slots during which common logic circuits of the register subsystem are used for processing data related to that junctor, and access is provided to the memory for storage and processing of data associated with that register junctor. A third subsystem, a trunk scanner, is provided which also shares access to the memory, so that each word time cycle has a time period for the register-sender subsystem, a time period for the translator and route selector subsystem, and a time period for the trunk scanner subsystem. An advantage of the system is that data processing logic circuits may be used which are relatively slow, and still take maximum advantage of a somewhat faster memory access time, since each of the subsystems may be processing a word while other subsystems are provided access to the memory. Thus in a communication switching system the register subsystem may have logic circuits which are shared by register junctors, with there being a register junctor using the register logic circuits at all times, while still providing time for the translator and other circuits to have access to the same memory. However the number of subsystems sharing the memory for a given word cycle time is limited by the memory access time. Also it is possible that a subsystem may attempt to read a word when another subsystem already has the word out, which may result in lost or erroneous information being rewritten.

SUMMARY OF THE INVENTION

According to the invention, in a system having a plurality of digital data processing subsystems sharing the same memory, each subsystem having a memory access period as covered by said Wirsing and Miller application, there is provided comparison means connected to the address generators to indicate a conflict of the addresses therein for two of the subsystems, and the indication of conflict is used to cause one of these subsystems to be blocked from reading from the memory until the comparison means indicates that the conflict no longer exists.

According to a further feature of the invention, in a system in which one of the subsystems has cyclically recurring time slots and corresponding sequential addressing of the memory, another subsystem is blocked from access to the memory if its address generator is set to a word which the sequential access system will use during the current time slot or at the beginning of the next time slot. Each time slot may comprise a plurality of subtime slots, each equal to a memory word cycle for reading, processing, and rewriting one word.

According to another feature of the invention, one of the memory access periods is shared during alternate memory word cycles by two subsystems, thereby providing for sharing of the same memory by an additional subsystem without increasing the memory word cycle time.

The above-mentioned and other objects and features of this invention and the manner of obtaining them will become more apparent, and the invention itself will be best understood, by reference to the following description of an embodiment of the invention taken in conjunction with the accompanying drawings comprising FIGS. 1–8 wherein.

DESCRIPTION OF THE PREFERRED EMBODIMENT

Figure 1:
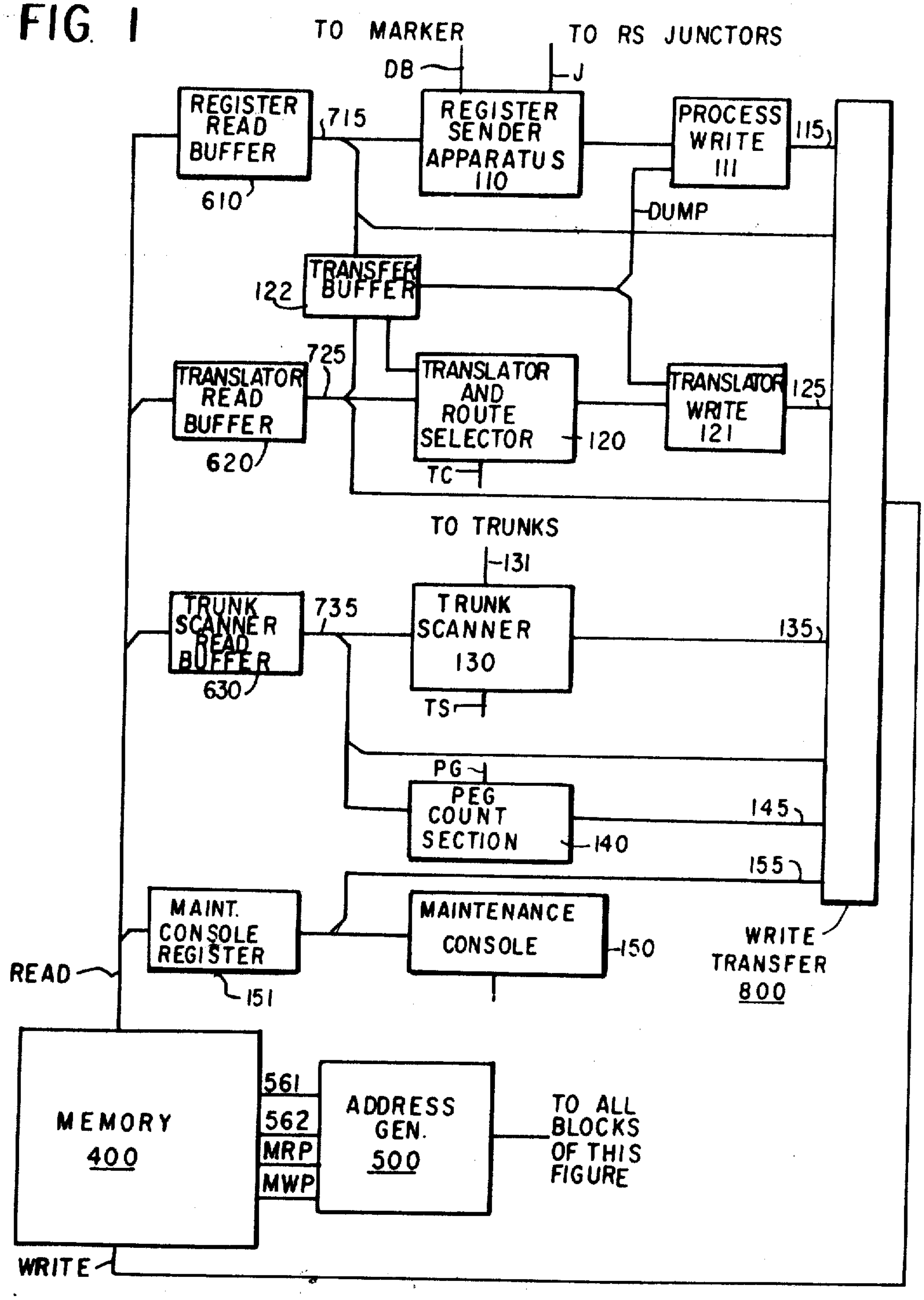
FIG. 1 is a block diagram of a digital control and memory arrangement, comprising the common control equipment for a communication switching system, which includes several subsystems.

The digital control and processing circuits include flip-flop storage devices and various logic gates. Each of the flip-flops includes two transistors in a bistable circuit configuration. Each flip-flop has eight input terminals and two output terminals. To set a flip-flop to state one, producing a true indication, requires coincidence of a signal on a D.C. input and a trigger pulse on an A.C. input; and in like manner to reset it to state zero, indicating a false condition, requires coincidence of a D.C. input and an A.C. input. The flip-flops are shown in the drawings as having the inputs on the left-hand side with one or two small coincidence gates on the upper half to set the flip-flop and one or two similar coincidence gates on the lower half for reset. Each such coincidence gate is shown with the A.C. or trigger pulse input at the center of its left side, and the D.C. or control input at the top or bottom. The outputs are shown with the state one output at the top and the state zero output at the bottom on the right-hand side.

Gated pulse amplifiers are shown as triangles with four input leads on the base on the left-hand side and an output at the apex on the right-hand side. The upper input on the left-hand side is a capacitance-coupled trigger-pulse input terminal, and the other three inputs are for D.C. control inputs. The circuit is arranged so that unused D.C. inputs do not have any effect on the operation. If there is a connection shown only to the second input lead the signal thereon when true enables the amplifier to pass the pulse supplied to the upper input. If there are connections to the second and third inputs, they act as an AND circuit so that only when both of these inputs are true is the amplifier enabled to pass the pulse at the upper input. If there is also a connection to the lower input it acts as an OR circuit with the other control inputs so that when it is true it enables the amplifier. If the gated pulse amplifier has a connection only to the upper input then it always passes a pulse supplied thereto.

The logical operations are performed by direct coupled resistance-transistor logic in the form of NOR gates. However, for simplicity of disclosure the gates in the drawings are shown as being either AND gates as indicated by a line across the gate parallel to the base, or as OR gates indicated by a diagonal line.

Typical schematic diagrams of these circuit elements are illustrated in said Lee et al. patent, FIG. 78.

In this system the true condition of a signal, the one state, is represented by a negative eight-volt potential; while the false condition of a signal, the zero state, is represented by ground potential.

Figure 3:
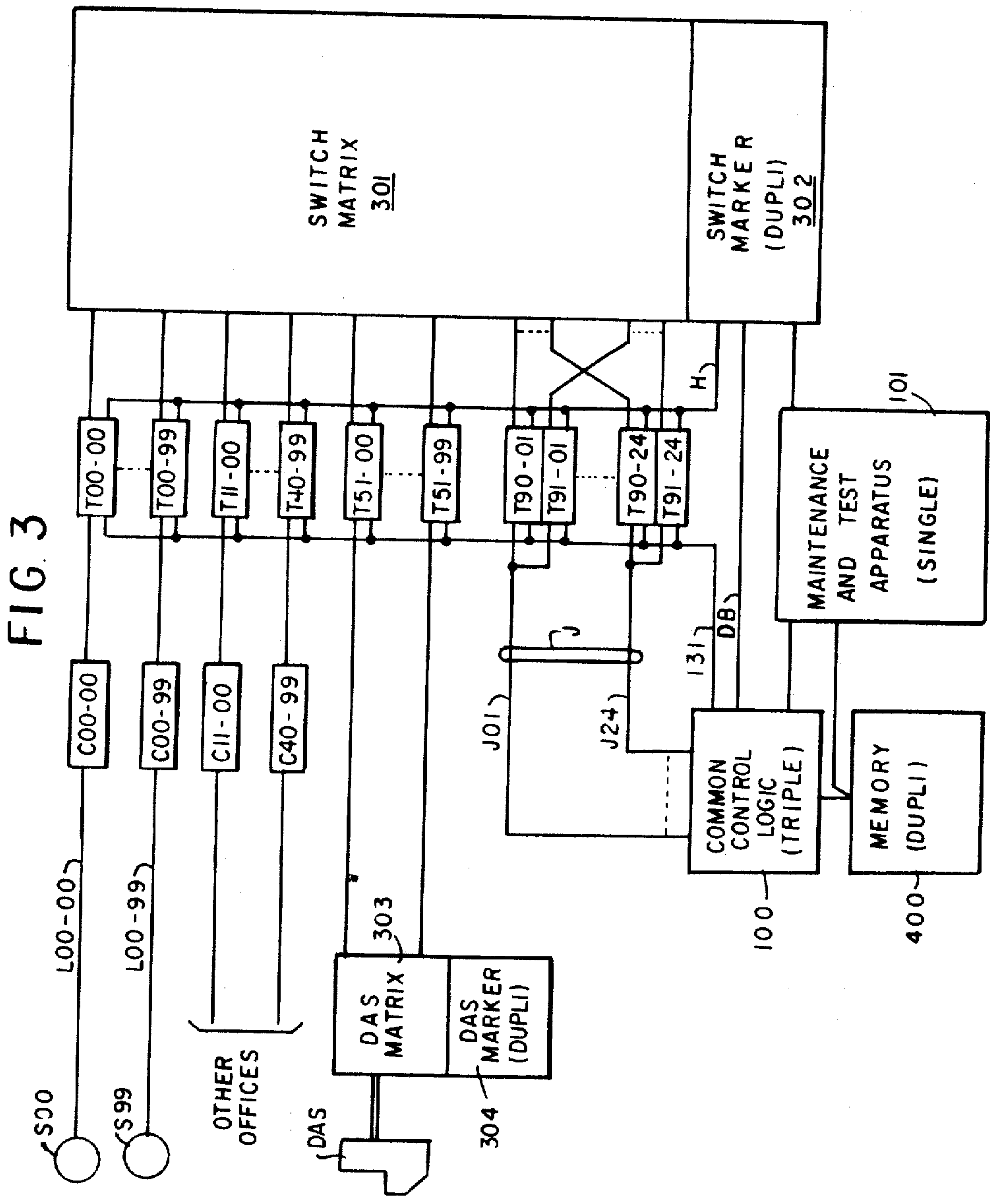
FIG. 3 is a block diagram of the communication switching system.
Figure 4:
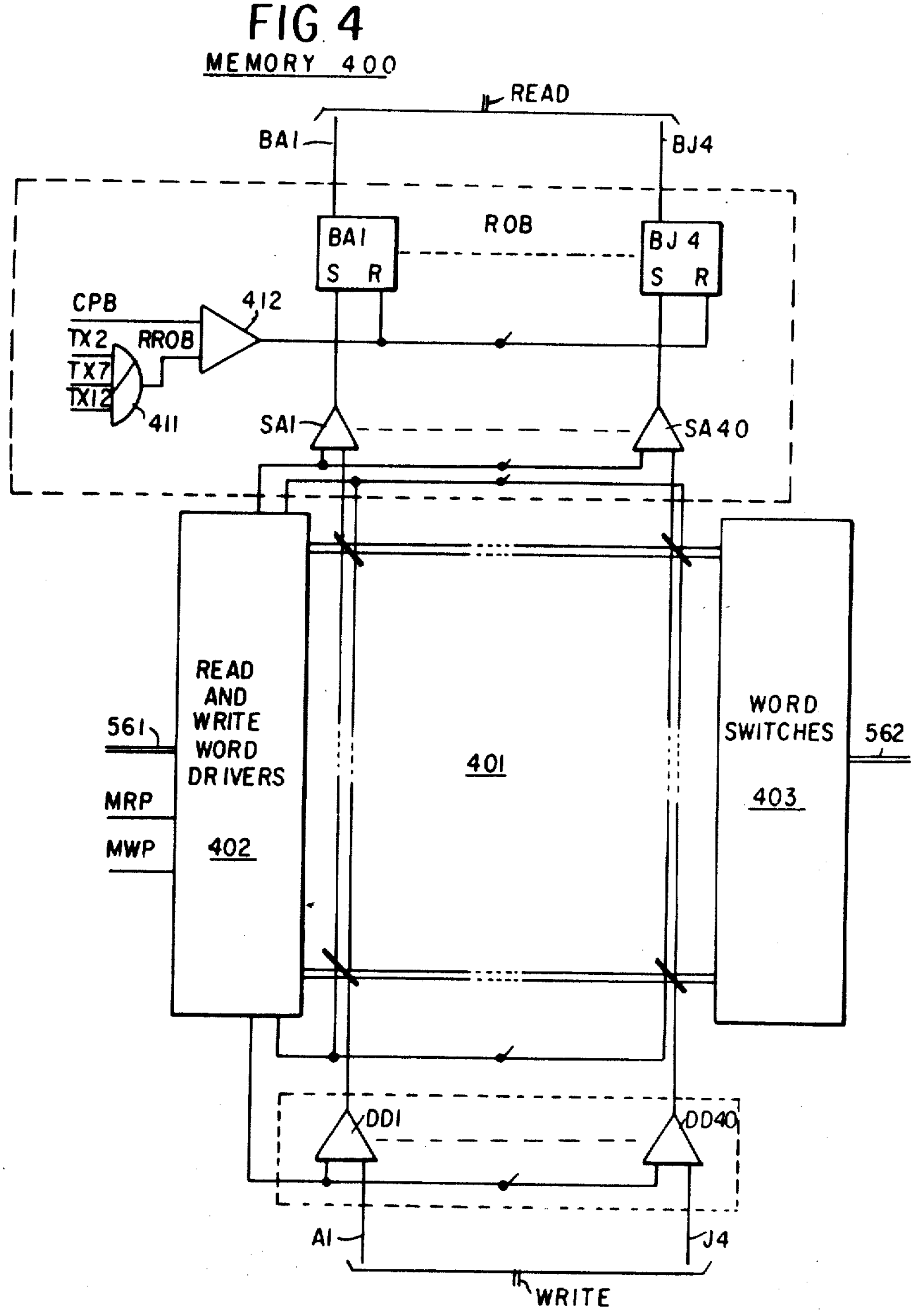
FIG. 4 is a functional block and symbolic diagram of the memory and its access circuits.

OUTLINE (A) Common Digital Control Equipment (FIG. 1)
(B) Communication Switching System (FIG. 3)
(C) Operation of Control Equipment for the Switching System (FIGS. 1 and 3)
(D) Other Common Control Equipment (FIG. 1)
(E) Memory (FIG. 4)

Figure 6:
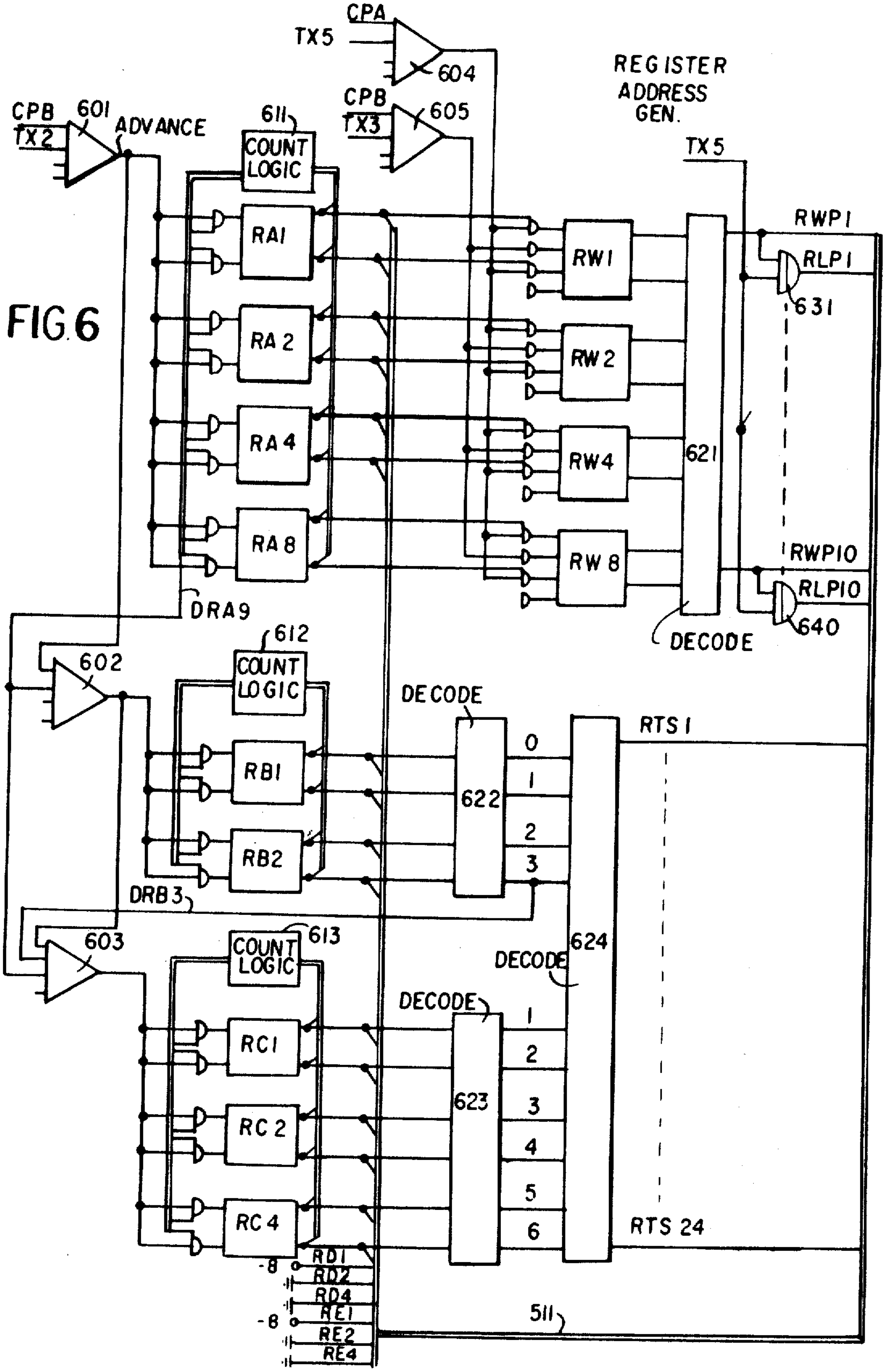
FIG. 6 is a more detailed block diagram of the register-sender address generator.
Figure 7:
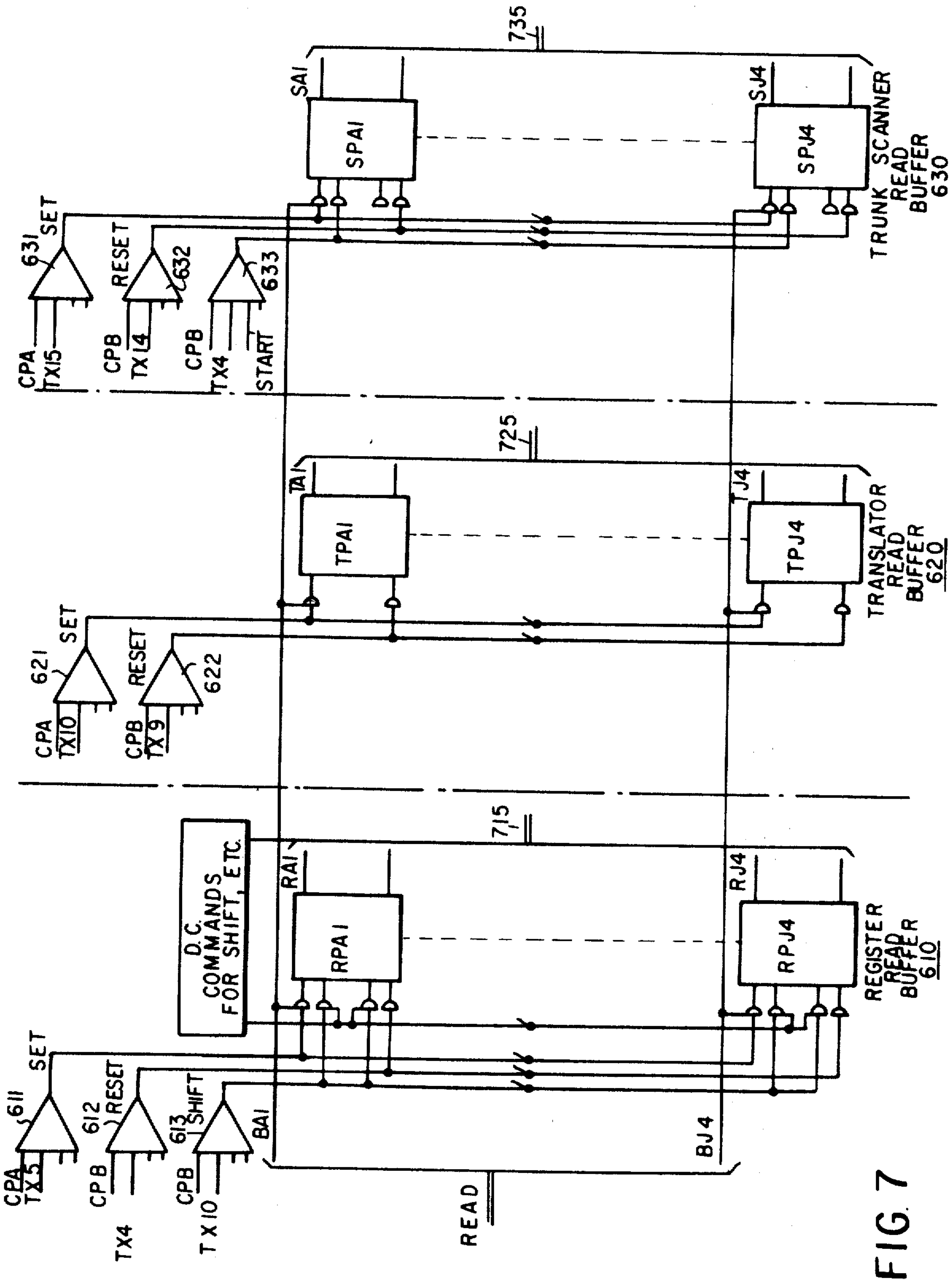
FIG. 7 is a functional block diagram of the read-out buffers for the different subsystems.

(F) Address Generator (FIGS. 5 and 5A)
- (F1) Word time cycle
- (F2) Address of subsystems with word time sharing
- (F3) Memory word blockage
- (F4) Register address generator (FIG. 6)
- (F5) Register sender subsystem time division multiplex timing arrangement
- (F6) Translator and trunk scan address generator (G) Memory Reading (FIG. 7)

Figure 8:
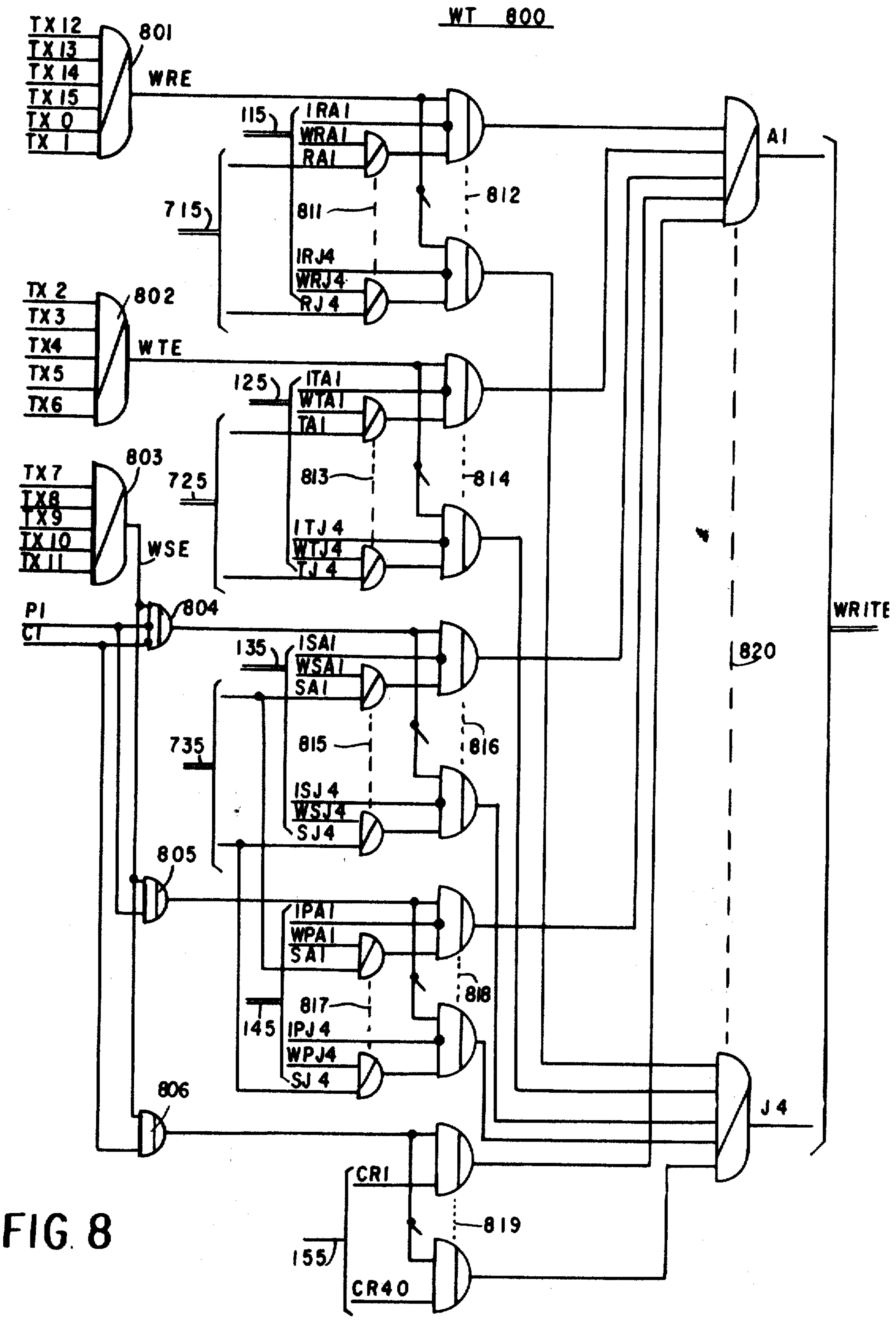
FIG. 8 is a functional block diagram of the common write circuits.

(H) Memory Writing (FIG. 8)

(A) COMMON DIGITAL CONTROL EQUIPMENT (FIG. 1)

The digital control and memory arrangement which provides the common control equipment for a communication switching system is shown in FIG. 1. A first subsystem comprises register-sender apparatus along with a register read buffer 610 and process write control circuits 111. A second subsystem comprises a translator and route selector 120 along with a translator read buffer 620 and write control circuits 121; and also a transfer buffer 122 which provides for communication with the register-sender subsystem and for other functions. A third subsystem comprises a trunk scanner 130 along with a trunk scanner read buffer 630. A peg count section 140 also uses the trunk scanner read buffer 630 during time periods when the trunk scanner is not using it. There is also an auxiliary subsystem comprising a maintenance console 150 along with a maintenance console register 151 which alternate the use of a memory access period with the trunk scanner read buffer 630.

All of the above subsystems make use of the same memory assembly 400. This is a destructive readout type ferrite core memory of the word organized or linear select type. An address generator 500 supplies the signals for reading and writing the words in and out the memory, and supplies appropriate timing signals to all of the blocks of the common control equipment. The timing signals are shown in a set of graphs of FIG. 2.

(B) COMMUNICATION SWITCHING SYSTEM (FIG. 3)

The communication switching system is shown by a single line block diagram in FIG. 3. This is the system disclosed in the Murphy et al. U.S. Pat. 3,328,534. The switch matrix 301 and marker 302; and the line, trunk and junctor circuits T00–00 through T91–24 are shown in a co-pending U.S. patent application for an Identifying Arrangement for Communication Switching Systems by A. S. Cochran et al. Ser. No. 463,587 filed June 14, 1965. This is basically a tandem switching center, although there are some subscriber lines L00–00 through L00–99 for pushbutton tone dialing subscriber stations S00 through S99 respectively. These lines are served by the switch matrix termination line circuits shown for example as T00–00 through T00–99. Trunk circuits T11–00 through T40–99 are shown for serving trunk lines to other offices. Both the subscriber lines and the trunk lines may be provided with transmission equipment C00–00 through C40–99 which may for example be carrier equipment. There is a dial assistance switchboard DAS which has operator positions connected through a separate switching matrix 303 having its own marker 304 with lines connected for example through trunk circuits T51–00 through T51–99 to switching matrix terminals. There are a plurality of register-junctors, each comprising a register terminal circuit and a sender terminal circuit, for example the first junctor comprises a register terminal circuit T90–01 and a sender terminal circuit T91–01 and the last junctor comprises a register terminal circuit T90–24 with a sender terminal circuit T91–24.

The common control equipment for the switching system includes common control logic 100 which is triplicated, and the memory 400 which is duplicated. There is also maintenance and test apparatus 101 which is provided singly (not duplicated). Referring to FIG. 1 the maintenance and test apparatus includes the maintenance console 150, the maintenance console register 151, and other equipment not shown. The common control logic comprises all of the units shown in FIG. 1 except for the maintenance console MC with its register MR, the peg count section 140 and the memory 400. Associated with the triplication of the common control logic and the duplication of the memory there are comparison and transfer circuits which are not shown in FIG. 1 or in any of FIGS. 4–9.

(C) OPERATION OF CONTROL EQUIPMENT FOR THE SWITCHING SYSTEM

To briefly explain the operation of the system, assume that a call is originated at station S00. The call request is detected in the line circuit T00–00 and provides a signal over a conductor of a set of conductors H to the switch marker. The switch marker identifies the calling line circuit, and supplies its line equipment number over a set of conductors DB to the register-sender apparatus 110 (FIG. 1). The register-sender apparatus selects an idle one of the register-sender junctors, and then returns both the originating line equipment number T00–00 and the register terminal equipment number such as T90–01 to the switch marker. The marker finds an idle path through the switch matrix between these two terminals and causes a four-wire connection to be established. The register-sender apparatus then returns dial tone through the register junctor and the matrix connection to the line equipment T00–00, and from there via the line to the station S00. The calling subscriber then operates his pushbutton set to supply a number of digits, which may for example include a priority digit and a called line directory number.

There is a portion of the memory 400 comprising a plurality of rows which is individually associated with each of the register-sender junctors, in which all information relating to the progress of a call during seizure and dialing is recorded. This information is supplied from the register-sender apparatus via process write control circuit 111 which can control the writing or inhibiting of a bit of information in each of the register-sender words. This information is supplied via the common write circuits 800 and the set of conductors WRITE into the memory in rows designated by the address generator 500 in a subsequent multiplex cycle when this address is again generated the information is read from the memory via conductor set READ into the register read buffer 610. This information is used by the register-sender apparatus in processing the call, and any bits which are not modified are recirculated directly from the buffer 610 to the common write circuits 800 and rewritten in the same row of the memory.

Each of the digits keyed by the subscriber at station S00 in the call being described is received via the terminal T90–01 and junctor line J11 in the register-sender apparatus and is recorded in the memory via the circuits 111 and 800.

The transfer buffer 122 provides for communication between the register-sender apparatus and the translator and route selector. Whenever the register-sender apparatus needs the services of the translator and route selector on a particular call it generates a request digit which is recorded in the memory. Then on the next multiplex cycle this request indication appears in the register read buffer 610, and is detected in the transfer buffer 122. The translator and route selector 120 can serve only one call at a time; and therefore when it is seized a busy indicating device is set in the transfer buffer, and an indication is supplied via the process write circuit 111 to write an indication in the memory associated with that particular register to mark it as the one which is using the translator.

The portion of the memory associated with the translator and route selector includes sections for information associated with the line and trunk circuit equipment, some of which is "semi-permanent" such as the type of line or trunk circuit, and the class of service which may be provided, and translation information relating directory numbers and equipment numbers; and also "temporary" information such as the busy-idle status of each of the trunk circuits, and the priority rating of any call using that circuit. The translator write circuits 121 can be used to modify the temporary information. The permanent information read into the translator read buffer 620 is rewritten via the write transfer circuits 800.

In the call being described, the first seizure of the translator occurs when the calling line service request has been received in the register-sender apparatus from the switch marker, and a register has been assigned. At this time the translator is seized and the calling line equipment number which has been stored in the memory is supplied from the register read buffer 610 to the transfer buffer 122. The translator then looks up this number in memory using the translator read buffer 620, and supplied class mark information associated therewith via the transfer buffer 122, and thence via the process write circuits 111 to write this information in the register memory. The next seizure of the translator occurs after a given number of digits have been dialed, these digits being supplied from the register memory via the register read buffer 610 to the transfer buffer 122. The translator and route selector 120 then uses the translator read buffer 620 to find information relating to the code identified by these digits. Instructions for the register and possible routing information are supplied via the transfer buffer and the process write circuits 111 to the register memory. The seizure of the translator may similarly be repeated after additional digits are received.

When the register has sufficient routing information and instructions from the translator, assuming that this is an outgoing call to be routed via another office, it supplies the equipment number of the sender which is 91–01, along with the equipment number of a selected outgoing trunk such as 40–99, this information being supplied via the set of conductors DB to the switch marker. The switch marker causes a path to be found and a connection to be established through the switch matrix between these two network terminals. Digits are then generated and transmitted from the register-sender apparatus via line J01 to the sender junctor, and transmitted through the switch matrix connection and the outgoing trunk circuit to the other office. After the completion of sending, information is supplied via the set of conductors DB to the switch marker to cause it to release the connections from the register junctor and the sender junctor and to establish a direct connection through the switch matrix between the calling line circuit T00–00 and the outgoing trunk circuit T40–99. The register and sender junctors and the associated information in memory are then returned to the idle state.

(D) OTHER COMMON CONTROL EQUIPMENT

The trunk scanner has a set of conductors 131 with a connection to each of the line and trunk circuits to detect when each becomes idle. The trunk scanner includes a relay connect arrangement to connect to a group of trunks and supplies the address for the first trunk of the group to the address generator 500. The addresses for the trunks of this group are then generated in sequence, read out into the trunk scanner read buffer 630, the status checked and written into the memory via the write transfer circuits 800. This section of the memory can be accessed both by the trunk scanner 130 and by the translator and route selector 120.

The peg count section 140 (which is *not* triplicated) contains apparatus for monitoring traffic conditions and recording statistical information such as each time a particular piece of equipment is used. Whenever the trunk scanner is in the process of operating its relay connect means to change to another group of trunks, its memory access time is used by the peg count section.

The maintenance console 150 and maintenance console register 151 can access any word in the memory. The maintenance console register 151 is separate from the other read buffers which are part of the common control logic. It alternates with the trunk scanner read buffer for memory access.

(E) MEMORY (FIG. 4)

The memory is shown in FIG. 4. It comprises a ferrite core array 401 along with read and write circuits. The memory as actually constructed comprises up to six modules, with each module consisting of 1152 words. Electrically the array can be considered as a plurality of columns and rows with each row comprising one word. Each row comprises 44 cores, of which only the first and the fortieth are shown in the first and the last row. Forty of the cores in each row are used to store the forty bits of a word, while the other four bits are used for parity checking purposes and therefore are not shown in any of the drawings. Each row has a unique word address designated by A, B, C, D, and E digits with respective values of 1 out of 8, 1 out of 4, 1 out of 6, 1 out of 6 and 1 out of 6. The E digit designates the particular core module. The address row is selected by the combination of read and write word drivers 402 shown on the left side of the array, and word switches 403 shown on the right side of the array. There are twenty-four read drivers and twenty-four write drivers, with each combination of a B digit and a C digit designating one read driver and one write driver. The address generator also supplies read and write pulses to actuate the selected read or write driver respectively. Each of the word switches is designated by the combination of A, D, and E digits. The word drivers and the word switches are interconnected by wires threaded through the rows of cores as shown. The columns of the array are threaded by write conductors from digit drivers DD1–DD40 respectively, and also by sense conductors to sense amplifiers SA1–SA40 respectively. The outputs of the sense amplifiers are used to set flip-flops BA1–BJ4 in a readout buffer ROB. The forty bits of a word are grouped into ten digits, each with a 1 out of 16 value, and each comprising four bits. The ten digits are designated A through J. Thus flip-flop BJ4 stores the fourth bit of the J digit.

(F) ADDRESS GENERATOR (FIGS. 5 AND 5A)

Figure 2:
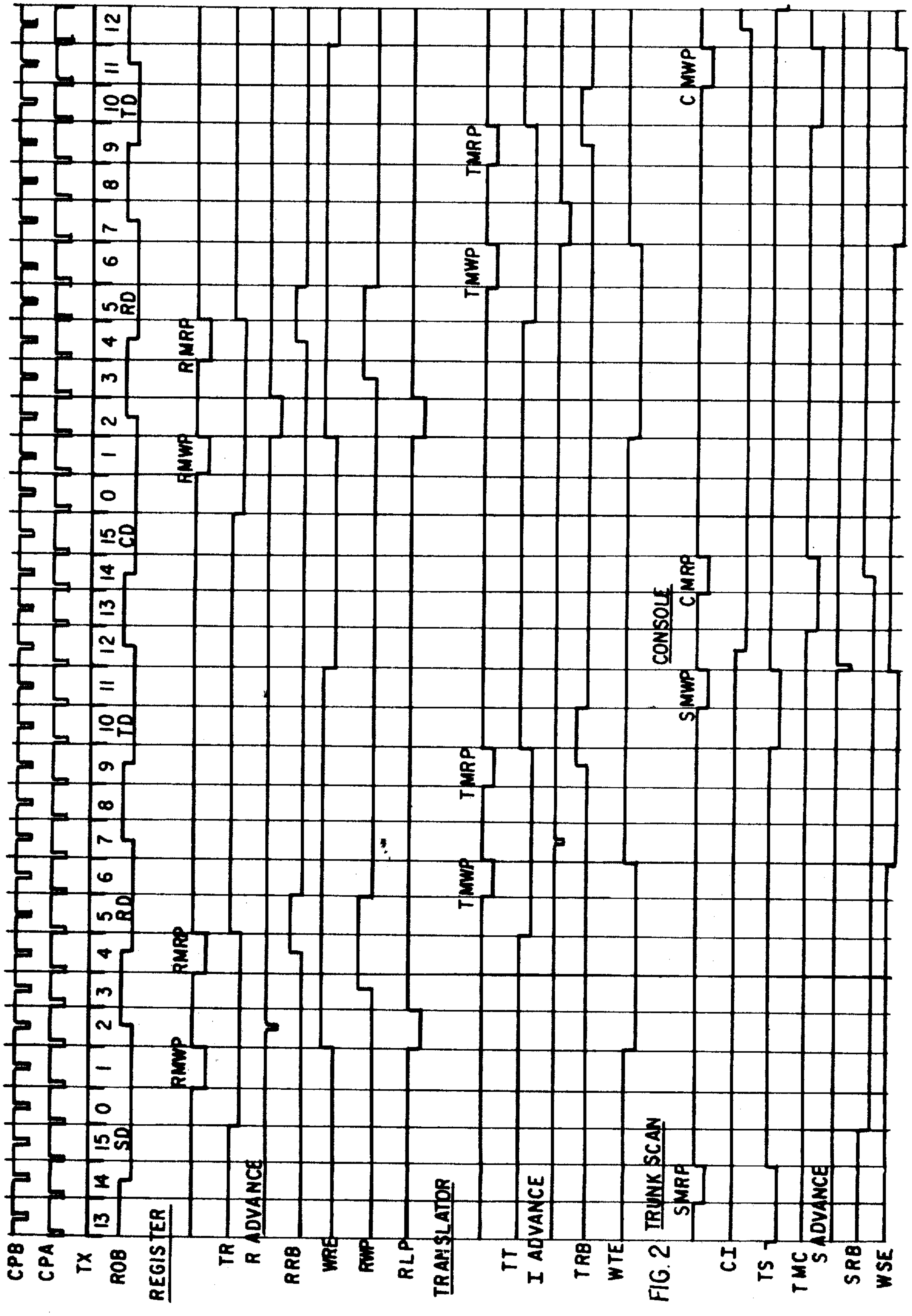
FIG. 2 is a timing graph explaining the operation of the system.
Figure 5:
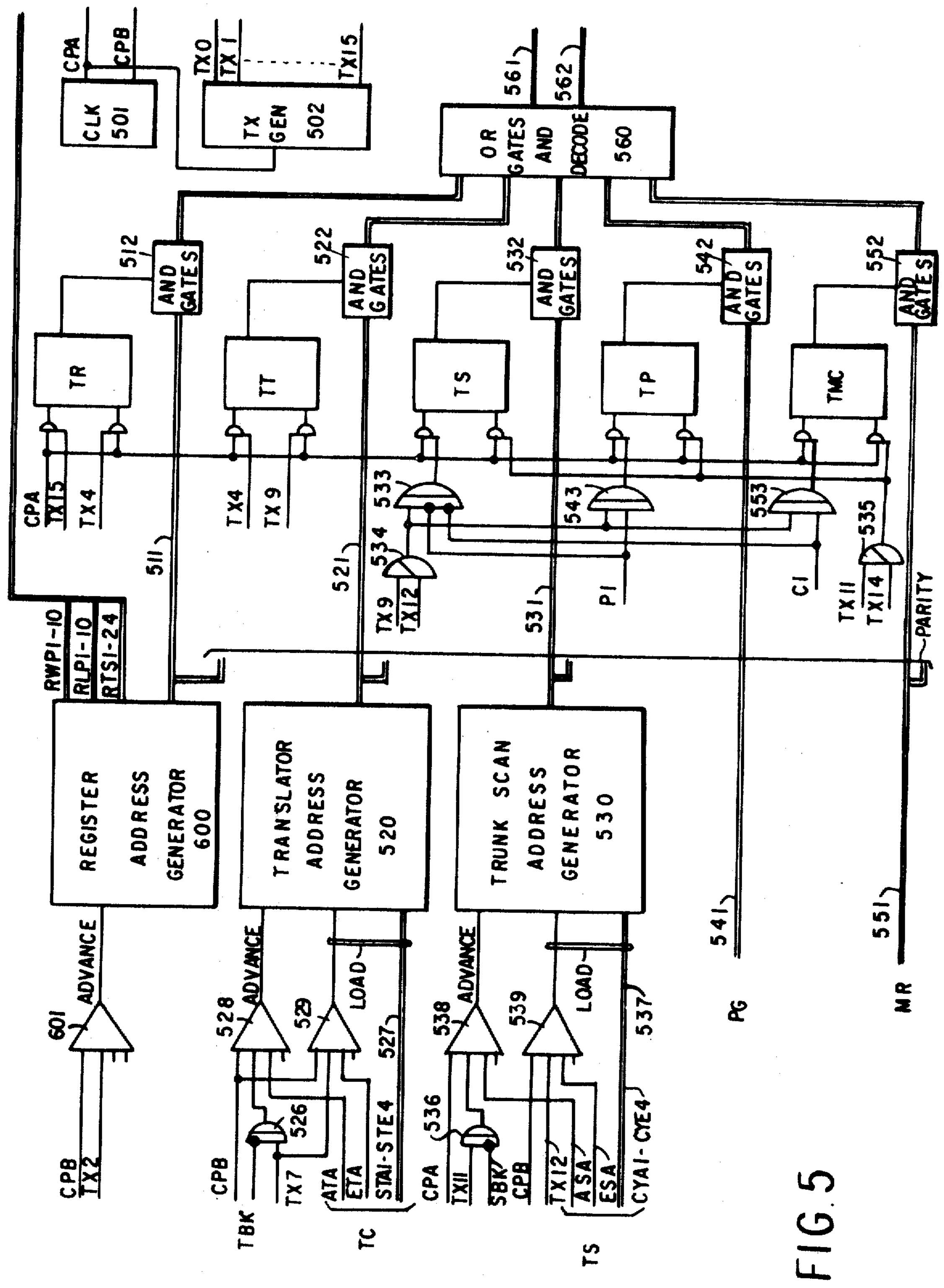
FIGS. 5 and 5A are a functional block diagram of the address generators.
Figure 5A:
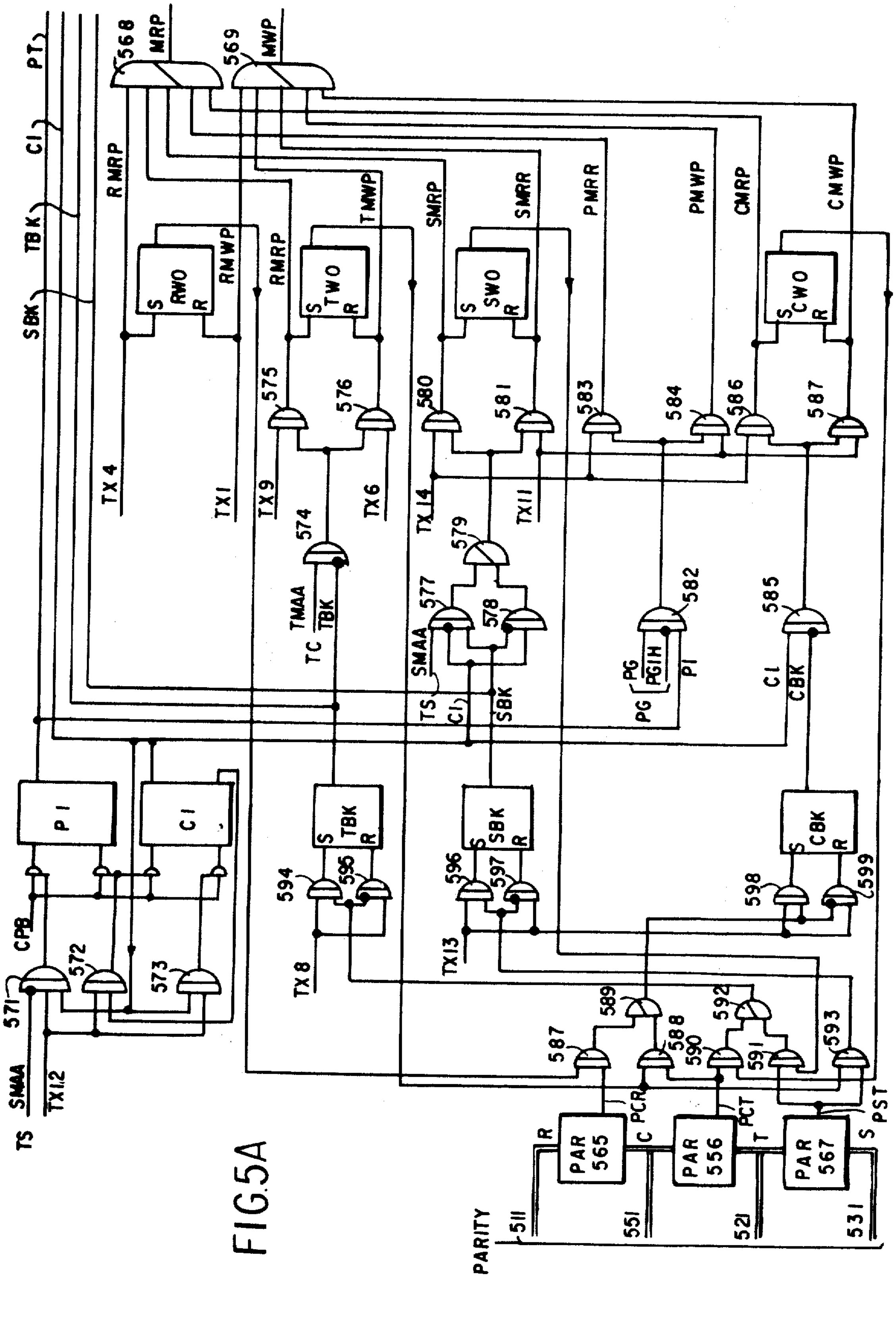

The address generator 500 is shown in FIGS. 5 and 5A. The circuits shown in these figures are part of the triplicated common control logic, except for the basic clock CLK which is common. The clock provides two clock pulse trains CPA and CPB. Both trains consist of one microsecond pulses that occur at a 100 kilohertz rate, with the two trains being displaced in time from one another by five microseconds, as shown at the top of FIG. 2. These pulses are used as the clock pulse or AC input of flip-flops and gated amplifiers throughout the common control equipment.

(F1) Word time cycle

A TX generator which is basically a sixteen step ring counter produces a set of sixteen mutually exclusive ten microsecond pulses. TX0 through TX15 which occur in numerical order. The TX generator is driven by the CPA pulse train causing each TX pulse to begin with the leading edge of one CPA pulse and to end with the leading edge of the following CPA pulse. Upon reaching the TX15 time interval the generator then returns to TX0 to start another cycle.

A *memory word time* (cycle) comprises one cycle of the TX generator, which is 160 microseconds. For each of the subsystems shown in FIG. 1, a word time (cycle) may be defined as the time from the generation of the address of a word, followed by reading the word from the memory into the read buffer, until that word is written back into the memory. In all cases this time is sixteen steps of the TX generator or 160 microseconds. However according to the invention three word times are interleaved so that the register-sender may process a different register word during every cycle of the TX generator, and the other subsystems of the common control equipment may also each process a word during sixteen steps of the TX generator.

(F2) Addressing of subsystems with word time sharing

The addresses to the memory word drivers and word switches are supplied from FIG. 5 via the OR gates and decode logic 560. There are five sets of input conductors to these OR gates, only one set at a time of which may be enabled to supply an address. Each of the five digits of the address is supplied in binary code, and is decoded for use by the memory. The A digit in binary code comprises three bits having values of 4, 2 and 1 respectively, and is decoded into one of the eight values 0, 1–7.

The B digit is binary coded with two bits having values of 2 and 1, and is decoded into one of the four values, 0, 1, 2, 3. The C, D and E digits each are binary coded with three bits having values of 4, 2 and 1, and is decoded into one of the six values 1–6, the binary codes of 000 and 111 being unused. The decoded B and C digits are supplied via the set of conductors 561 to the read and write word drivers 402 in FIG. 4, and the decoded A, D and E digits are supplied via the set of conductors 562 to the word switches 403 in FIG. 4.

The register address is supplied from the register address generator 600. The register access to the memory is governed by flip-flop TR, which is set by the CPA pulse at the end of the interval TX15 and reset at the end of the interval TX4 as shown by the graph TR in FIG. 2. While the flip-flop is set it enables the AND gates 512 to couple the output from the address generator 600 via the set of conductors 511 to the OR gates and decode logic 560. The register address bits are RA1, RA2, RA4, RB11, RB2, RC1, RC2 and RC4. In addition bits RD1 and RE1 always have value "1," and bits RD2, RD4, RE2 and RE4 always have value "0."

The translator address is supplied via the translator address generator 520. The translator access to the memory is governed by flip-flop TT which is set by the pulse CPA at the end of the interval TX4 and reset at the end of the interval TX9 as shown by the graph TT in FIG. 2. When the flip-flop is set it enables the AND gates 522 to couple the outputs from the address generator 520 via the set of conductors 521 to the OR gates and decode logic 560. The translator bits are TA1–TE4

The trunk scan address is generated by the trunk scan address generator 530. The trunk scan use of the memory is governed by flip-flop TS, which when set enables the AND gates 532 to couple the output of the address generator 530 via the set of conductors 531 and the AND gate decode logic 560. The trunk scan bits are SA1–SE4.

The peg count address is generated in the peg count section 140 (FIG. 1). The peg count access to the memory is governed by flip-flop TP which when set enables the AND gates 543 to couple the peg count address via the set of conductors 541 to the OR gates decode logic 560. The peg count bits are PA1, etc.

The maintenance console address is generated in the maintenance console register 151 (FIG. 1). The maintenance console access to the memory is governed by flip-flop TMC which when set enables AND gates 552 to couple the address via the set of conductors 551 to the OR gates and decode logic 560. The console bits are CA1–CE4.

Thus during the memory word time occurring during each cycle of the TX generator, the register has access to the memory as indicated by TR from the end of interval TX15 to the end of interval TX4, and the translator as indicated by TT has access from the end of interval TX4 to the end of interval TX9. During the third portion of the memory word time TX cycle, occurring from the end of interval TX9 to the end of interval TX14, either the trunk scanner, or the peg count section, or the maintenance console has access to the memory during TX10 and TX11 to write a word, and another of them has access during TX13 and TX14 to read a word. The selection of one of these three units is governed by the flip-flops PI and CI shown in FIG. 5A. Basically the trunk scanner and the maintenance console have access to the memory during alternate memory word time TX cycles, as determined by flip-flop CI whose state is changed by the clock pulse CPB during every occurrence of the interval TX12. Thus whenever the flip-flop CI is in the reset state, its zero output in coincidence with signal TX12 enables gate 572 so that the flip-flop is set upon the occurrence of CPB; and in the next TX cycle the "1" output of flip-flop CI in coincidence with signal TX12 enables gate 573 so that the pulse CPB resets the flip-flop. The state of the flip-flop is shown by the graph CI in FIG. 2 which is in the "0" state during the TX cycle shown at the left side of the graph thereby providing a trunk scan interval, and is in the "1" state during the cycle shown at the right half of the graph thereby providing a console interval. Thus the trunk scanner and the maintenance console are allowed alternate scanner word times to access the memory. The trunk scanner accesses the memory during one scanner word time and then waits one scanner word time for the maintenance console to have memory access before it has the opportunity to access the memory again.

In addition to sharing scanner word times with the maintenance console, the trunk scanner will, at times, allot its memory access time to the peg count section. This results from the fact that after the trunk scanner has scanned a trunk group (16 or 32 scanner word times) it will select another trunk group to be scanned. Since this is done through a reed relay tree, a period of 10 milliseconds is allotted for the tree to be pulled into a new configuration. It is during this time that the peg count section is allowed the trunk scanner's memory access. This is governed by the flip-flop PI. Whenever the trunk scanner is requesting memory access a signal SMAA is true which inhibits gate 571. When this signal is false the peg count section may use the memory by flip-flop PI being set and reset upon alternate occurrences of the interval TX12 via gates 571 and 572, flip-flop PI being reset whenever flip-flop CI is set and vice versa.

Referring again to FIG. 5, during a memory word time allotted to the trunk scanner both the flip-flops PI and CI are in the reset condition so that AND gate 533 may be enabled, during the word time allotted to the peg count section the flip-flop PI is set so that gate 543 may be enabled, and during a word time allotted to the maintenance console flip-flop CI is set so that gate 553 may be enabled. The trunk scanner word time flip-flop TS will be set to read a word at the end of the interval TX12 via a signal through OR gate 534 and AND gate 533, the flip-flop being reset at the end of interval TX14 via a signal from OR gate 535. When this world is to be written into the memory the trunk scanner will again be provided access by setting flip-flop TS at the end of interval TX9 via a signal through gates 534 and 533, and reset at the end of interval TX11 via a signal through gate 535. These read access and write access times are shown by the graph TS in FIG. 2.

If the peg count section is using the memory instead of the trunk scanner the flip-flop TP is similarly set via gates 534 and 543 and reset via gate 535.

During the maintenance console word time flip-flop TMC is set via gates 534 and 553 and reset via gate 535, which is indicated by the graph TMC in FIG. 2.

The signals MRP and MWP for enabling the read and write drivers of the memory are shown generated in FIG. 5A. The memory read pulse MRP is produced via gate 568 whenever any one of the five units provides a read pulse, and the memory write pulse MWP is produced via OR gate 569 whenever any one of the five units produces a write pulse. The register memory read and write pulses RMRP and RMWP are produced during every cycle of the TX generator in the intervals TX4 and TX1 respectively as shown in FIG. 2 in the first graph of the register. The translator memory read and write pulses TMRP and TMWP are produced in intervals TX9 and TX6 respectively via gates 575 and 576 as shown in the first graph for the translator in FIG. 2, whenever the output of gate 574 is true. This gate is enabled when the translator is requesting memory access by signal TMAA, and the flip-flop TBK is in the reset state. The scanner memory read and write pulses are produced during intervals TX14 and TX11 respectively via gates 580 and 581 whenever the output of gate 579 is true as shown in the first graph under the trunk scan portion of FIG. 2, whenever the scanner is requesting memory access by signal SMAA. The peg count read and write signals PMRR and PMWP are similarly true during the intervals TX14 and TX11 respectively whenever the output of gate 582 is true. The maintenance console read and write pulses CMRP and CMWP are produced during intervals TX14 and TX11 whenever the output of gate 585 is true.

(F3) Memory word blockage

Since the system memory is of a destructive read type, an all zeros condition will be present in the memory word location whenever the word has been read out. In addition, the cores in the row of the memory for that word will remain all zeros until a word is written back. Therefore there is need for memory access blockage for the case where a circuit attempts to read a memory row that has at that time been read out of memory but not written back.

Since the maintenance console can access any memory location, and since both the translator and the trunk scanner can access the portion of the memory allotted to trunk status, each of these circuits are blocked if the memory location addressed has previously been read out, but not written back in. In addition, since the maintenance console can read memory rows from the register portion of the memory, the maintenance console will be blocked before it has the opportunity to address the memory location which would block the register.

The result of blockage is that the blocked circuit is prevented from generating read-write commands and from advancing its address generator. This allows the circuit that was blocked to have access to this word as soon as the blocking condition is removed.

The latch circuits RWO, TWO, SWO and CWO will be in the set condition whenever the register, translator, trunk scanner, or maintenance console respectively have a word out of memory. The corresponding latch circuit being set on the read pulse and set on the write pulse as shown.

A parity circuit 565 compares the register generator address on the set of conductors 511 to the maintenance console address on the set of conductors 551. The register subsystem uses sequential access to the memory, with junctor time slots designated by the RB and RC bits, and subtime slots designated by the RA bits, as described below in sections (F4) and (F5). All register addresses have RD1 and RE1 values of "1"; and RD2, RD4, RE2 and RE4 values of "0." During the last subtime slot of each time solt a signal RWP10 is true, at which time bit RA1 has a value of "1" and bits RA2 and RA4 have a value of "0." In the first subtime slot bits RA1, RA2 and RA4 all have values of "0." The maintenance console has access to the register section of the memory, but should not be permitted to interfere with the sequential stepping by the register. Therefore parity circuit 565 is arranged to produce a signal PCR whenever the maintenance console attemps to read any of the eight words for the junctor whose time slot the register address generator is currently scanning, or attempts during the last subtime slot to read a word having a decoded A digit of "0." This is accomplished with the following Boolean logic:

$$PCR=(CD1\cdot\overline{CD2}\,\overline{CD4}\,CE1\cdot\overline{CE2}\,\overline{CE4})$$

$$[(RB1*CB1)(RB2*CB2)(RC1*CC1)(RC2*CC2)(RC4*CC4)$$

$$+RWP10(\overline{RA1}*CA1)(RA2*CA2)(RA4*CA4)]$$

In the above equation * indicates equality, e.g.

$$(RB1*RB1)=(RB1\ RC1)+(\overline{RB1}\ \overline{RC1})$$

A parity circuit 566 compares the maintenance console address on the conductor set 551 to the translator address on conductor set 521 and whenever the two addresses are the same generates a true output signal PCT. A parity circuit 567 compares the translator address on conductor set 521 to the trunk scanner address on conductor set 531 and generates a true output signal PST whenever the two addresses are the same.

A trunk scanner block latch SBK is set as a function of the address selected during the scanner address advance interval TX12 and stored in the trunk scanner address generator being identical to the address in the translator address generator, and that the translator has a word out of memory as indicated by the latch circuit TWO being set. The latch circuit SBK will remain set until the translator returns the word to memory ($\overline{TWO}$), or it addresses a different word. This is accomplished via gate 593 whose output is true when the output of parity circuit 567 is true in coincidence with latch circuit TWO being set, which is coincidence with signal TX13 via gate 596 sets latch circuit SBK. When the output of gate 593 becomes false the signal TX13 via gate 597 resets SBK.

The translator block latch TBK is set as a result of either the trunk scanner or the maintenance console having the word addressed by the translator out of memory, and it will remain set until neither circuit has this word out of memory. Thus the output of gate 590 will be true when the output of parity circuit 566 is true in coincidence with latch CWO being set. The output of gate 591 is true when the output of parity circuit 567 is true in coincidence with the output of latch SWO being true. The output of either of these AND gates 590 or 591 via OR gate 592 in coincidence with signal TX8 sets the latch circuit TBK via gate 594. When the output of OR gate 592 becomes false in coincidence with signal TX8 the latch circuit TKB is reset via gate 595.

The maintenance console block latch CBK with respect to the translator is similar in operation to both of the latches TBK and SBK. It is set when the translator has the requested word out of memory as indicated by the output of parity circuit 566 in coincidence with the latch TWO being set via gate 588, this signal being supplied via OR gate 589 which in coincidence with signal TX13 via AND gate 598 sets the latch CBK. When the signal from gate 588 via OR gate 589 becomes false, coincidence with signal TX13 via gate 599 resets the latch CBK. With respect to the register, however, the operation differs from both the latches TBK and SBK. The latch CBK is set when the maintenance console either attempts to read from the memory one of the eight words associated with the register junctor whose address is currently being generated by the register address generator, or during a register word pulse RWP10 from the register address generator, it attempts to read a word from the register portion of the memory that has a decoded A digit of "0." Under these conditions the parity circuit 565 is arranged so that its output will be true. This signal in coincidence with the output of latch RWO via AND gate 587 and OR gate 589 will in coincidence with signal TX13 at gate 598 set the latch CBK. The latch is reset via gate 599 when the output from OR gate 589 becomes false in coincidence with the signal TX13.

A command "peg count inhibit" PGIH is true whenever the peg count section generates an illegal address. The output of gate 582 is true when a peg count section enabling signal PGE is true in coincidence with the output of flip-flop PI and the pen count inhibit signal is false. The output of this gate permits the peg count memory read and write pulses to be generated at the appropriate time.

(F4) Register address generator (FIG. 6)

The register address generator 600 is shown by a functional block diagram in FIG. 6. The A digit address is generated by flip-flops RA4, RA2 and RA1; the B digit is generated by flip-flops RB2 and RB1, and the C digit is generated by flip-flops RC4, RC2 and RC1. The decoded D digit for the register address is always equal to "1," which is symbolized by showing signal RD1 at −8 volts potential and signals RD2 and RD4 at ground potential. Also the decoded E digit is always equal "1" which is symbolized by the signal RE1 shown at −8 volts potential and the signals RE2 and RE4 at ground potential. The flip-flops for the A, B, and C digits are connected to act as counters, using count logical 611 for the A digit, count logic 612 for the B digit, and count logic 643 for the C digit. The address is advanced one step by a pulse from the output of gated pulse amplifier 601 when pulse CPB appears during the interval TX2. The A digit counter is provided with an additional flip-flop RA8 to provide for a cycle of ten counts, which permits the first two rows for each register to be accessed twice during a register time slot. The decoded output signals from the three flip-flops RA4, RA2 and RA1 provide the decoded values of 0–7 to address the eight words associated with one register. On the count advance signal from gated pulse amplifier 601 following the decoded value 7, flip-flop RA8 is set and flip-flops RA1, RA2 and RA4 are reset to provide a decoded value of 8. On the next count flip-flop RA1 is set to provide a decoded value of 9. On the next step the signal on lead DRA9 indicating the decoded value of 9 enables gated pulse amplifier 602, so that the next signal from gated pulse amplifier 601 resets the A count to 0 and at the same time a pulse from amplifier 602 advances to B counter one step. In a like manner when the decoded output of the B counter is equal to 3 as indicated by the signal on lead DRB3, and the A counter is again advanced to the value of 9 as indicated by the signal on DRA9, the gated pulse amplifier 603 will be enabled, so that the next advance pulse from amplifier 601 resets the A and B counters and advances the C counter one step. The C counter logic is arranged to advance the count from 1 to 6 and then recycle back to 1.

The particular register being addressed is determined by the B and C counters. The output of these counters via decoded logic units 622, 623 and 624 supplies the register time slot signals RTS1 through RTS24.

(F5) Register sender subsystem time division multiplex timing arrangement

The common logic apparatus of the register-sender subsystem comprising in FIG. 1 the register-sender apparatus 110, the process write circuit 110 and the register read buffer 610 is used on a time division multiplex sharing basis by all of the register-sender junctors (the register-junctors are peripheral units for the register subsystem). The register-sender junctors are scanned sequentially in numerical order and each is allotted use of the common control for a period of 1.6 milliseconds (ten register word times) which is called a register junctor time slot. The time slot is identified by the combination of the B and C register address digits. The respective time slot enabling signals RTS1–RTS24 are provided via decode logic circuits 622, 623 and 624.

Associated with each register junctor there are eight memory words, which is a total of 192 memory words for the register-sender subsystem. The A digit counter flip-flops RA4, RA2 and RA1 select a word from the particular register-sender junctor subset.

The register-sender subsystem makes use of a "folded word" memory feature covered by U.S. Pat. 3,299,214 issued Jan. 17, 1967 to K. E. Prescher et al. for Communication Switching System Common Control Arrangement, this feature also being used in the system described in the D. K. K. Lee et al. U.S. Pat. 3,301,963. In the systems disclosed in those patents each register junctor has associated therewith six memory words the first of which is designated a control word and the other five of which are designated data words. The feature provides that during each register time slot the control word is accessed twice while each of the data words is accessed once. This requires a total of seven subtime slots the first and seventh being used to access the control word, and the second through the sixth being used to access the respective data words. Thus the information from the control word may be stored in carry buffer devices and made available in processing the data word information, and at the end of the register time slot the information in the control word may be up-dated during its second access period. In the present system there are provided two control words and six data words, requiring a total of ten subtime slots, each having a duration of one memory word. Therefore the A digit counter is provided with ten steps having decoded values of 0–9, with the first control word accessed when the A digit is equal to 0 or 8, the second control word accessed when the A digit is equal to 1 or 9, and the six data words accessed respectively when the A digit is equal to values of 2–7. It will be noted that the output of the flip-flops RA4, RA2 and RA1 is the same during steps 0 and 8, and is also the same during steps 1 and 9, so that the bits from these three flip-flops may be used for memory addressing via conductive set 511. Therefore the output of flip-flop RA8 is not supplied to the conductor set 511.

All ten count values of the A digit are required by the logic circuits in the apparatus 110 and 111. The contents of the flip-flops RA1, RA2, RA4 and RA8 are gated into the flip-flops RW1, RW2, RW4 and RW8 respectively on the CPA pulse that occurs at the end of the interval TX5 via gated pulse amplifier 604. The outputs of these flip-flops are then decoded to produce the register word pulse signals RWP1–RWP10 via decode logic 621. In conjunction with producing the register word pulse signals, the same set of decode logic output 621 are supplied through AND gates 631–640 in coincidence with the signal TX5 to produce the register latch pulses RLP1–RLP10 which are used to signify the ends of the respective register word pulses. The register latch pulses are used by the common logic to store information that is read from one memory word and that is needed to analyze information stored in another memory word during some later register word pulse occurring during the same register time slot. In addition the latch pulse RLP10 is used to reset certain latches in the common control at the end of the register time slot, thus not leaving any residual information for the next register-sender junctor.

The register time slot pulses, register word pulses and register latch pulses are supplied to the register-sender apparatus 110 and process write circuits 111, and also to the register-sender junctors to identify which is using the common logic circuits at that time. Thus it has been shown that the twenty-four register-sender junctors are identified by cyclically recurring respective time slot pulses enabling them to use the common register-sender logic apparatus on a time division multiplex basis, and that during each time slot there are ten subtime slots for accessing eight words of the memory, and reaccessing two control words.

(F6) Translator and trunk scan address generators

The translator address generator 520 and trunk scan address generator 530 are each provided with three flip-flops for an A digit counter, two flip-flops for a B digit counter, three flip-flops for a C digit counter, three flip-flops for a D digit counter, and three flip-flops for an E digit counter. Each of these two address generators operates either in a sequential mode, or may be loaded with an address for a random mode. In operation the translator will first supply an address with the five digits in binary code via conductor set 527 and at the same time supply an "enter translator address" signal ETA. During the interval TX7 the clock pulse CPB is gated via gated pulse amplifier 529 to load the address into generator 520. After there is an address loaded the translator may change to a sequential mode by generating the signal ATA. The translator address generator is inhibited from advancing whenever the latch TBK is set by the inhibit AND gate 526. If this latch is the reset condition then upon the occurrence of the TX7 interval with ATA true the gated pulse amplifier 528 gates the clock pulse CPB to actuate the translator address generator as a counter and to advance it one step.

Similarly the trunk scanner may supply a random address in binary code via conductor set 537, and supply an "enter scanner address" signal ESA. Then during the interval TX12 the gated pulse amplifier 539 gates the pulse CPB to load that address. After an address has been loaded the address generator 530 may be operated in a sequential mode by supplying a signal ASA from the trunk scanner. If the latch SBK has been set the address generator 530 is inhibited from advancing. When this latch is in the reset state then during interval TX11 the signal from AND gate 536 in coincidence with the signal ASA enables the gated pulse amplifier 538 to supply the clock pulse CPA to advance the address generator 530 one step as a counter.

The advance pulses for the three address generators 600, 520 and 530 when operating in the sequential mode are indicated on FIG. 2. Note that the R advance pulse occurs during interval TX2 between a register memory write pulse in interval TX1 and a register memory read pulse in interval TX4, so that after one word is written the address is advanced and then another word is read. Likewise the translator advance pulse occurs in interval TX7 between the translator memory write pulse in interval TX6 and the translator memory read pulse in interval TX9, so that after a word is written, the generator is advanced and the next word is read. The scanner of course is advanced only in alternate word times and the pulse occurs at the end of interval TX11 following a scanner memory write pulse so that during the next trunk scanner interval the following word will be read during interval TX14.

(G) MEMORY READING (FIG. 7)

As shown in FIG. 4, the data from every word read from memory is supplied through the sense amplifiers SA1–SA40 to the read out buffer flip-flops BA1–BJ4. The data in these flip-flops is shown in FIG. 2 by the graph ROB.

The data is then supplied from the readout buffer ROB to one of the read buffers shown in FIGS. 1 and 7, or to the maintenance console register 151. As shown in FIG. 7 the register read buffer 610 comprises forty flip-flops RPA1–RPJ4, the translator read buffer comprises forty flip-flops TPA1–TPJ4, and the trunk scanner read buffer 630 comprises forty flip-flops SPA1–SPJ4.

The following description will trace data out of the memory during the memory word times, as shown in FIG. 2. Beginning with interval TX4 a clock pulse CPB via gated pulse amplifier 612 resets the register read buffer 610. During the same interval TX4 a register memory read pulse RMRP causes data from one word to be supplied to the register readout buffer ROB as indicated by RD in FIG. 2. During interval TX5 this information is set in the register read buffer by a clock pulse CPA via gated pulse amplifier 611. During interval TX7 the signal RROB from OR gate 611 enables the gated pulse amplifier 612 so that the clock pulse CPB resets the flip-flops BA1–BJ4.

Next during interval TX9 the gated pulse amplifier 622 supplies the clock pulse CPB to reset the translator read buffer 620. During interval TX9 the translator memory read pulse TMRP causes a translator word of data to be supplied to the readout buffer ROB as shown by TD in FIG. 2. During interval TX10 the gated pulse amplifier 621 is enabled so that a clock pulse CPA sets the translator read buffer 620 with this data. During interval TX10 the signal RROB from gate 611 again enables gated pulse amplifier 612 so that the clock pulse CPB resets the readout buffer ROB.

Next consider a trunk scanner word time on the left half of FIG. 2. During interval TX14 the gated pulse amplifier 630 supplies a clock pulse CPB to reset the trunk scanner read buffer 630, and during the same interval a read pulse SMRP reads a word data from the trunk scanner into the readout buffer ROB as indicated by SD in FIG. 2. During interval TX15 the data is supplied to the trunk scanner read buffer 630 by a set signal from gated pulse amplifier 631. During interval TX2 the signal RROB from gate 611 enables gated pulse amplifier 612 to reset the readout buffer. During the alternate memory word time the maintenance console data CD is similarly supplied to the maintenance console register 151.

(H) MEMORY WRITING (FIG. 8)

The write transfer circuit 800 is shown in FIG. 8. It comprises forty OR gates 820 to supply the forty bits A1–J4 to control the digit driver DD1–DD40 shown in FIG. 4. The write control commands comprising a write register enable signal WRE from OR gate 801, a write translator enable signal WTE from OR gate 802 and a write scanner enable signal WSE from OR gate 803 are used to control the time intervals at which each circuit is allowed to write into memory via the write transfer circuit. The write register enable signal WRE is true from TX12 through TX1, which allows fifty microseconds for the write information to propagate through the various circuits and ten microseconds for writing into the memory array. The process write circuits 111 may write or inhibit selected ones of the forty bits of a register word via the set of conductors 115. The write signals WRA1–WRJ4 are supplied via the forty OR gates 811 to the forty AND gates 812, while the inhibit signals IRA1–IRJ4 are supplied directly to inhibit inputs of the gates 812. In the absence of a signal from the process write circuits, any bit will be recirculated directly from the register read buffer 610 via conductor set 715 to the forty OR gates 811. The gates 812 are all enabled by the signal WRE to supply the word to the OR gates 820 and then supply the conductor set WRITE to the digit drivers in FIG. 4. In response to the write pulse RMWP the word is written into the memory.

Similarly during generation of the signal WSE during intervals TX7–TX11, either the trunk scanner or the peg count section or the maintenance console can write into memory as determined by the flip-flops PI and CI supplying signals to gates 804, 805 and 806. The trunk scanner supplies signals by the conductor set 735 with write signals WSA1–WSJ4 to gates 815 and inhibit signals ISA1–ISJ4 to gates 816. The gates 816 are enabled whenever the output of gate 804 is true indicating a trunk scanner write interval. In a like manner during the peg count interval as indicated by flip-flop PI being in the set condition and enabling gate 805. The peg count section 140 may supply write or inhibit signals via conductor set 145 or re-write directly from the trunk scanner read buffer 630 via conductor set 735.

When the output of gate 806 is true as indicated by flip-flop CI being set during the write interval WSE, the maintenance console register MR supplies signal CR1–CR40 to be written into memory via the set of forty gates 819.

While there is described above the principles of the invention in connection with specific apparatus, it is to be clearly understood that this description is made only by way of example and not as a limitation to the scope of the invention.

What is claimed is:

1. A digital control system comprising a plurality of subsystems, a memory having read and write access circuits common to said subsystems, each of said subsystems having individual thereto a read buffer, processing circuits, write control circuits and an address generator, interconnected with one another and with said memory circuits;

timing means providing cyclically recurring time signals with each cycle representing a memory word time, the cycle being of fixed duration and divided to provide a memory access period of fixed duration and fixed sequence for each of the subsystems, with the period for each subsystem including a write interval, an address change interval, and a read interval in sequence; the timing means being connected to the read buffer, write control circuits, and address generator of each subsystem;

means including the connections to said timing means for each subsystem to set its address generator during its address change interval to one address and cause the word designated by that address to be read from memory during its read interval into its individual read buffer during one word cycle, means to perform data processing operations using the data of that word from its read buffer, and means to write into the memory at the same address during the write interval of its access period of the next word time cycle and then to cause its address generator to provide another address during its address change interval; so that while one subsystem has a word out of memory and is processing data and other subsystems may be provided with access to the memory during their periods of the word time cycle; means allowing each subsystem to change the setting of its address generator only during the address change interval of its individual memory access period, and whereby each subsystem uses said common read and write access circuits for any part of the memory only during its said access period of each cycle, and said access periods for the subsystems always occur in the same fixed sequence independently of any memory request signals;

the improvement comprising comparison means connected to the address generators to indicate a conflict of the addresses therein for two of said subsystems, wherein there is associated with each of said subsystems a "word out" bistable device which is set when a word is read out of memory for that subsystem and reset when the word is written at the same address, at least one of said subsystems having associated therewith a "block" bistable device, means responsive to an indication of a conflict in coincidence with one of said "word out" bistable devices being in set condition to set the "block" bistable device of the other of the two subsystems during an interval of the word cycle immediately preceding the read interval for that subsystem, means responsive to its "block" bistable device being in set condition to block that subsystem from access to the memory, and means responsive to an indication from said comparison means that said conflict no longer exists during a subsequent cycle to reset said "block" bistable device before the read interval, to thereby permit the word to be read.

2. A system as claimed in claim 1, wherein one of said subsystems comprises means making it a sequential access subsystem having a plurality of peripheral units, and wherein the address generator of that subsystem includes means which supplies cyclically recurring time slot signals individual to the peripheral units, so that each peripheral unit during its time slot has exclusive use of the processing circuits of the subsystem; each peripheral unit having an individual section of the memory to which the subsystem has access during the time slot of that peripheral unit;

the improvement wherein said comparison means includes a comparison circuit connected to the address generators of the sequential access subsystem and one other of the subsystems to compare the addresses therein to indicate a conflict if the address for the other subsystem is the same as the present or a potential sequentially approaching address for the sequential access subsystem, whereby the sequential access subsystem may continue its sequential stepping without interruption.

3. A system as claimed in claim 2, wherein the addresses comprise a first (D and E digits), a second (B and C digits), and a third (A digit) digital part; wherein a portion of the memory designated by a given value of said first part comprises all of said sections for the peripheral units, each time slot is designated by an individual value of said second part, wherein the means which supplies cyclically recurring time slot signals also supplies subtime slot signals in a sequence from a first to a last occurring during every time slot, the value of said third part being derived from the subtime slot signal, so that each combination of a time slot and a subtime slot signal designates a particular address;

wherein said comparison circuit is connected to the address generators to indicate a conflict if the address in the generator of the other subsystem has the first part of said given value in coincidence with the second part being equal to the time slot in the generator of the sequential access subsystem or with the third part corresponding to a first subtime slot while the address generator of the sequential access generator is at its last subtime slot value.

4. A system as claimed in claim 2, incorporated in a communication switching system, wherein said sequential access subsystem is a register subsystem and said peripheral units are junctors, means comprising the register subsystem and junctors to receive digital signals relating to a plurality of calls and to record them in said individual sections of the memory.

5. A system as claimed in claim 1, wherein said memory comprises means making it of the destructive readout type, so that as long as a subsystem has a word out of memory the corresponding set of memory elements are all in a zero state.

6. A digital control system comprising a plurality of subsystems, a memory having read and write access circuits common to said subsystems, each of said subsystems having individual thereto a read buffer, processing circuits, write control circuits and an address generator, interconnected with one another and with said memory circuits;

timing means providing cyclically recurring time signals with each cycle representing a memory word time, the cycle being of fixed duration and divided to provide a memory access period of fixed duration and fixed sequence for each of the subsystems, with the period for each subsystem including a write interval, an address change interval, and a read interval in sequence; the timing means being connected to the read buffer, write control circuits, and address generator of each subsystem;

means including the connections to said timing means for each subsystem to set its address generator during its address change interval to one address and cause the word designated by that address to be read from memory during its read interval into its individual read buffer during one word cycle, means to perform data processing operations using the data of that word from its read buffer, and means to write into the memory at the same address during the write interval of its access period of the next word time cycle and then to cause its address generator to provide another address during its address change interval; so that while one subsysem has a word out of memory and is processing data the other subsystems may be provided with access to the memory during their periods of the word time cycle; means allowing each subsystem to change the setting of its address generator only during the address change interval of its individual memory access period, and whereby each subsystem uses said common read and write access circuits for any part of the memory only during its said access period of each cycle, and said access periods for the subsystems always occur in the same fixed sequence independently of any memory request signals;

the improvement comprising means associating two of said subsystems with the same memory access period, including a "subsystem indication" device (CI) having a distinct state for each of these two subsystems and means to change its state between the write interval and the read interval during said same memory access period, and means coupling said device to the memory access circuits to permit the subsystem corresponding to the current state of the device to read a word from the memory during the read interval of one cycle and write at the same address during the write interval of the same memory access period of the next cycle; while subsystems associated with other access periods are provided with access to the memory during their respective periods.

7. A system as claimed in claim 6, wherein said "subsystem indication" device is connected to change state every cycle, so that said two of said subsystems with the same memory access period are provided with access to the memory in alternate cycles.

8. A system as claimed in claim 6, incorporated in a communication switching system which includes a plurality of trunk circuits, wherein one of said subsystems is a register subsystem arranged to receive digital signals relating to a plurality of calls, and to record the digital signals in corresponding sections of the memory;

wherein another of the subsystems is a translator-and-route-selector subsystem arranged to receive digital signals and to supply corresponding routing information;

wherein said two subsystems associated with the same memory access period comprise a trunk-scan subsystem and an auxiliary subsystem, the trunk-scan subsystem having means connected to the trunk circuits to scan them to determine their busy or idle status and to record this information in a route selection portion of the memory, there being means providing access to the route-selector section of the memory by both the trunk-scan subsystem and the translator-and-route-selector subsystem;

wherein said "subsystem indication" device is connected to change state every cycle, so that the trunk-scan subsystem and the auxiliary subsystem are provided with access to the memory in alternate cycles.

9. A system as claimed in claim 8, wherein said memory comprises means making it of a destructive readout type so that as long as a subsystem has a word out of memory the corresponding set of memory elements are all in a zero state;

said system further comprising comparison means connected to the address generators to indicate a conflict of the addresses therein for two of said subsystems, wherein there is associated with each of said subsystems a "word out" bistable device which is set when a word is read out of memory for that subsystem and reset when the word is written at the same address, the translator-and-route-selector, the auxiliary, and the trunk-scan subsystems each having associated therewith an individual "block" bistable device, means responsive to an indication of a conflict in coincidence with one of said "word out" bistable devices being in set condition to set the "block" bistable device of the other of the two subsystems during an interval of the word cycle immediately preceding the read interval for that subsystem, means responsive to its "block" bistable device being in set condition to block that subsystem from access to the memory, and means responsive to an indication from said comparison means that said conflict no longer exists during a subsequent cycle to reset said "block" bistable device before the read interval, to thereby permit the word to be read.

10. A system as claimed in claim 9, wherein said register subsystem has a plurality of peripheral junctor units, and wherein the register address generator includes means which supplies cyclically recurring time slot signals to said junctor units, so that each junctor unit during its time slot has exclusive use of the processing circuits of the register subsystem; each junctor unit having an individual section of the memory to which the register subsystem has access during the time slot of that junctor unit;

wherein said comparison means includes a first comparison circuit (565) to indicate a conflict of the auxiliary address and an address corresponding to the current time slot of a junctor unit or the next address to be generated by the register address generator, means responsive to the last said indication of conflict to block the auxiliary subsystem from reading from the memory until said comparison circuit indicates that the register subsystem has, in its sequential stepping, passed the auxiliary subsystem address;

wherein during the said time slot of each junctor unit a plurality of addresses are generated in a fixed sequence, each address comprising a time slot designating portion and a subtime slot designating portion, and wherein said first comparison circuit indicates a conflict whenever the time slot portion of the register address corresponds to a corresponding portion of an auxiliary address, and also when the auxiliary address corresponds to the next time slot address and the subtime slot portion of the address is the first address of the time slot.

11. A system as claimed in claim 10, wherein said comparison means further includes a second comparison circuit (556) to indicate a conflict between an auxiliary address and a translator-and-route-selector address;

wherein said comparison means further includes a third comparison circuit (567) to indicate an address conflict between the translator-and-route-selector subsystem and the trunk-scan system.

References Cited

UNITED STATES PATENTS

| | | | |
|---|---|---|---|
| 3,158,844 | 11/1964 | Bowdle | 340—172.5 X |
| 3,221,103 | 11/1965 | Adelaar et al. | 179—18 |
| 3,328,534 | 6/1967 | Murphy et al. | 179—18 |
| 3,401,380 | 9/1968 | Bell et al. | 340—172.5 |
| 3,408,628 | 10/1968 | Brass et al. | 340—172.5 |
| 3,247,488 | 4/1966 | Welsh et al. | |
| 3,348,210 | 10/1967 | Ochsner. | |
| 3,469,239 | 9/1969 | Richmond et al. | |

PAUL J. HENON, Primary Examiner

S. R. CHIRLIN, Assistant Examiner